United States Patent
Kawashima et al.

(10) Patent No.: US 7,187,566 B2
(45) Date of Patent: Mar. 6, 2007

(54) THREE-PHASE RECTIFIER

(75) Inventors: Reiji Kawashima, Shiga (JP); Kenichi Sakakibara, Shiga (JP); Sumio Kagimura, Osaka (JP); Isao Tanatsugu, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 10/221,795

(22) PCT Filed: Mar. 16, 2001

(86) PCT No.: PCT/JP01/02139

§ 371 (c)(1),
(2), (4) Date: Apr. 1, 2003

(87) PCT Pub. No.: WO01/69770

PCT Pub. Date: Sep. 20, 2001

(65) Prior Publication Data

US 2003/0161168 A1 Aug. 28, 2003

(30) Foreign Application Priority Data

Mar. 17, 2000 (JP) ............................ 2000-081802

(51) Int. Cl.
 *H02M 7/00* (2006.01)
 *H02M 5/45* (2006.01)
 *H02P 5/34* (2006.01)
(52) U.S. Cl. ........................ 363/125; 363/37

(58) Field of Classification Search .............. 363/34, 363/37, 84, 89, 90, 125, 126, 127
See application file for complete search history.

(56) References Cited

U.S. PATENT DOCUMENTS

| 4,461,010 | A | * | 7/1984 | Titus ........................... 373/108 |
| 4,646,222 | A | * | 2/1987 | Okado et al. ............. 363/56.05 |
| 5,620,582 | A | * | 4/1997 | Lerner ......................... 205/107 |
| 5,808,882 | A | * | 9/1998 | Mochikawa .................. 363/46 |
| 5,920,474 | A | * | 7/1999 | Johnson et al. ............. 363/126 |
| 6,407,476 | B1 | * | 6/2002 | Nishimura ................... 310/180 |
| 6,549,434 | B2 | * | 4/2003 | Zhou et al. .................... 363/39 |
| 6,555,992 | B2 | * | 4/2003 | Asao et al. ..................... 322/28 |

FOREIGN PATENT DOCUMENTS

| JP | 9-312541 | 12/1997 |
| JP | 11-196565 | 7/1999 |

* cited by examiner

*Primary Examiner*—Matthew V. Nguyen
(74) *Attorney, Agent, or Firm*—Smith, Gambrell & Russell, LLP

(57) ABSTRACT

A capacitor-input type three-phase rectification circuit comprises a three-phase AC power supply (1), a diode rectifier circuit (4), and a low-frequency filter connected between the three-phase AC power supply (1) and the diode rectification circuitry (4), the low frequency filter consisting of AC reactors (2u)(2v)(2w) and Δ-connection or Y-connection capacitors (8u)(8v)(8w), so that higher harmonic currents are reduced to be equal to or less than standard values, and that lowering in input power factor and lowering in DC voltage are prevented from occurrence.

5 Claims, 14 Drawing Sheets

THREE-PHASE RECTIFIER

FIELD OF TECHNOLOGY

This invention relates to improvement of a three-phase rectifier.

RELATED ART

Conventionally, trial of reduction in higher harmonics currents is proposed by connecting AC reactors or DC reactors, as shown in FIG. 19, in a three-phase rectifier of capacitor input type. Specifically, a common mode filter, AC reactors, and a diode rectifying circuit are connected to a three-phase power supply in this order, a smoothing capacitor is connected between output terminals of the diode rectifying circuit and an inverter is connected in parallel to the smoothing capacitor. Further, an output of the inverter is supplied to a motor.

When the three-phase rectifier having the arrangement illustrated in FIG. 19, disadvantages arise in that reactors each having a larger inductance value to some degree are needed to satisfy a higher harmonics standard (standard applied to devices input currents of which is equal to or less than 16 A per phase), and that lowering in input power factor (increase in input current) and lowering in DC voltage are caused because a phase oh an input current is greatly delayed with respect to that of the power voltage due to the inductance component of the reactors.

The present invention was made in view of the above problems.

It is an object of the present invention to offer a three phase rectifier which can suppress higher harmonics currents to equal to or less than the standard values, and can prevent lowering in input power factor and lowering in DC voltage.

DISCLOSURE OF INVENTION

A three-phase rectifier of claim 1 connects between a three-phase power source and a diode rectification circuitry a low frequency filter comprising Δ-connection or Y-connection capacitors.

A three-phase rectifier of claim 2 determines a % impedance of each of the AC reactors to be equal to or greater than 12% and equal to or less than 36%.

A three-phase rectifier of claim 3 determines an inductance value of each of the AC reactors to be equal to or greater than $(V/400)^2 \times 10$ m H (where, V is a voltage of the three-phase power supply) and equal to or less than $(V/400)^2 \times 30$ m H.

A three-phase rectifier of claim 4 determines a capacitance of the capacitor to be a capacitance so as to determine a resonance period of the AC reactor and the capacitor to be equal to or less than 1 cycle even when load is light.

A three-phase rectifier of claim 5 employs a capacitor included within a common mode filter for high frequency noise removal, as the capacitor.

A three-phase rectifier of claim 6 employs capacitors including a capacitor included within a common mode filter for high frequency noise removal, as the capacitor.

When the three-phase rectifier of claim 1 is employed, a phase of an input current can be advanced by flowing a resonance current to the low frequency filter, consequently lowering in input power factor and lowering in DC voltage are prevented from occurrence, because the low frequency filter is connected between the three phase power source and the diode rectification circuitry. Of course, higher harmonic currents are reduced to be equal to or less than standard values by the AC reactors.

When the three-phase rectifier of claim 2 is employed, a high input power factor is maintained in addition to the operation and effect of claim 1, because the % impedance of each of the AC reactors is determined to be equal to or greater than 12% and equal to or less than 36%.

When the three-phase rectifier of claim 3 is employed, a high input power factor is maintained in addition to the operation and effect of claim 1, because the inductance value of each of the AC reactors is determined to be equal to or greater than $(V/400)^2 \times 10$ m H (where, V is a voltage of the three-phase power supply) and equal to or less than $(V/400)^2 \times 30$ m H.

When the three-phase rectifier of claim 4 is employed, the higher harmonic currents are determined to be equal to or less than the standard values despite of variation in load in addition to the operation and effect of one of claims 1–3, because the capacitance of the capacitor is determined to be a capacitance so as to determine a resonance period of the AC reactor and the capacitor to be equal to or less than 1 cycle even when load is light.

When the three-phase rectifier of claim 5 is employed, capacitors are not needed to be especially provided so that increase in cost is prevented from occurrence in addition to the operation and effect of one of claims 1–4, because the capacitor included within the common mode filter for high frequency noise removal is employed as the capacitor.

When the three-phase rectifier of claim 6 is employed, increase in cost due to provision of capacitors is suppressed in addition to the operation and effect of one of claims 1–4, because the capacitors including the capacitor included within the common mode filter for high frequency noise removal are employed as the capacitor.

BEST MODE FOR CARRYING OUT THE INVENTION

Hereinafter, referring to the attached drawings, we explain three-phase rectifier of embodiments according to the present invention in detail.

Figure 1:
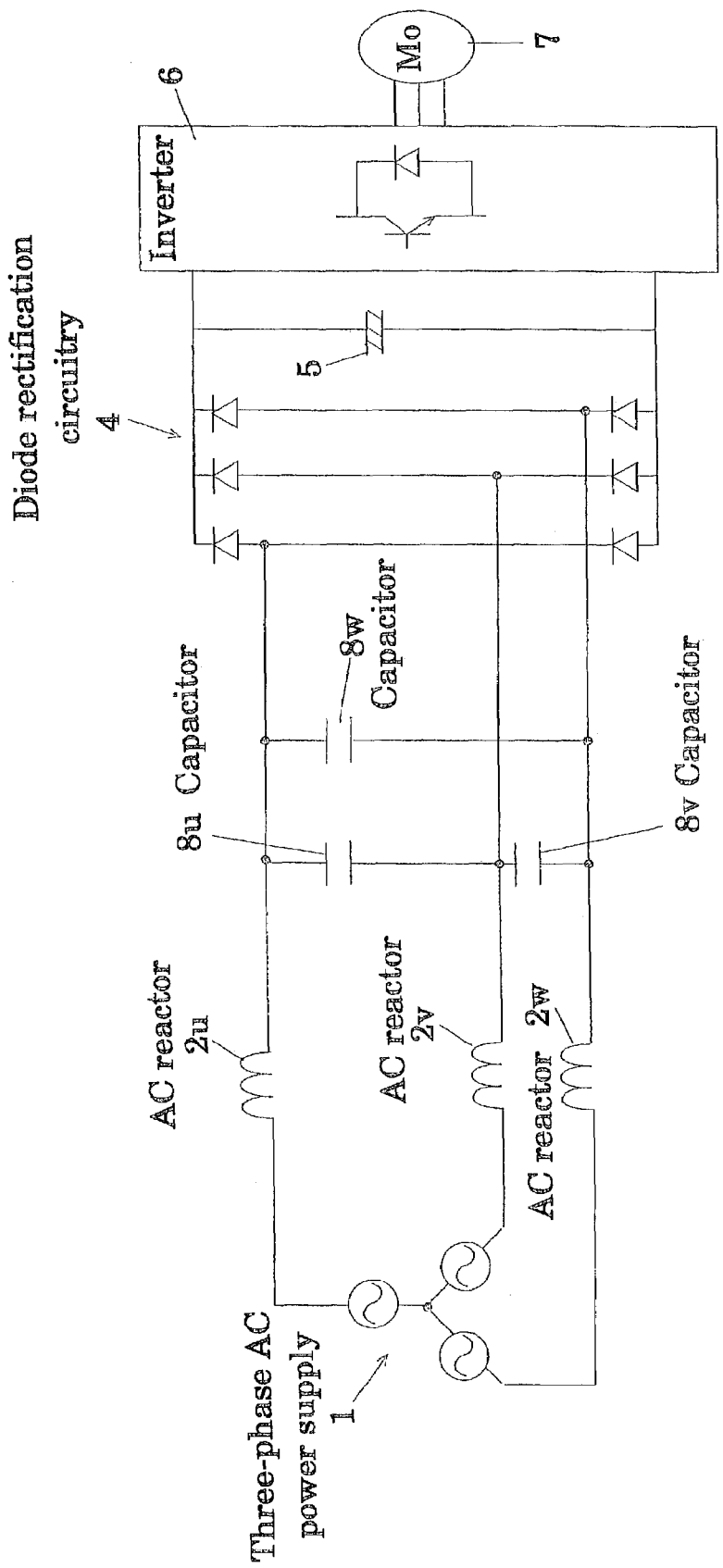
FIG. 1 is an electric circuit diagram illustrating an embodiment of a three-phase rectifier according to the present invention.

FIG. 1 is an electric circuit diagram illustrating an embodiment of a three-phase rectifier according to the present invention.

In this three-phase rectifier, each one terminal of AC reactors $2u$, $2v$ and $2w$ is connected to a terminal of each phase $1u$, $1v$ and $1w$ of a three-phase AC power supply 1. Each the other terminal of the AC reactors $2u$, $2v$ and $2w$ is connected to each input terminal of a diode rectification circuitry 4. A smoothing capacitor 5 and an inverter 6 are connected in parallel to one another between output terminals of the diode rectification circuitry 4. And, each of capacitors (filter capacitors) $8u$, $8v$ and $8w$ is connected between lines, each being between each of the other terminals of the AC reactors $2u$, $2v$ and $2w$ and each of the input terminals of the diode rectification circuitry 4. Also, an output from the inverter 6 is supplied to a motor 7. Further, the filter capacitors $8u$, $8v$ and $8w$ may be connected to one the other in Y-connection.

A %-impedance of each of three-phase AC reactors is determined to be equal to or greater than 12% and equal to or less than 36%, despite of rating power of the three-phase rectification circuitry. Further, the inductance value of each of the AC reactors is determined to be equal to or greater than $(V/400)^2 \times 10$ mH and equal to or less than $(V/400)^2 \times 30$ mH, where the rating power of the three-phase rectification circuitry is supposed to be about 6 kW and the voltage of the three-phase power supply is supposed to be V. Wherein, %-impedance % L [%] can be obtained by the equation of % L=$2\pi \cdot f \cdot L \cdot P/V^2$ (wherein, f is a power frequency, L is an inductance value of each of the AC reactors, V is a power voltage, and P is an input power). Therefore, the inductance value can be transformed into a %-impedance by using the above equation.

Operation and effect of the three-phase rectifier having the above arrangement are as follows.

Figure 2:
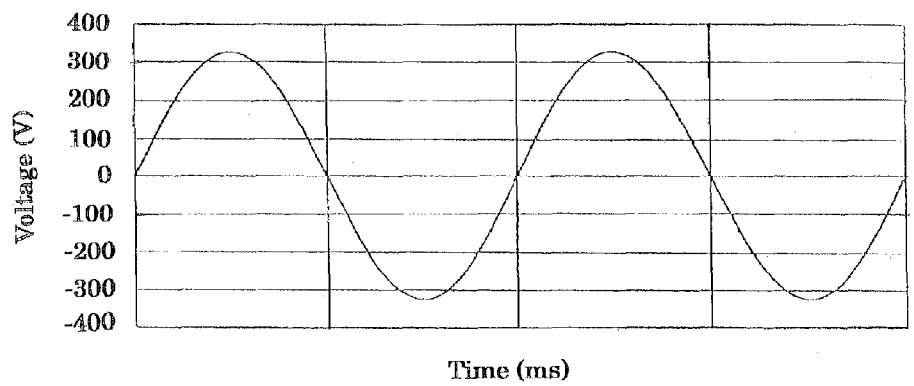
FIGS. 2(A)–2(C) are diagrams illustrating a power supply voltage wave pattern, an input current wave pattern, and a filter capacitor current wave pattern in the three-phase rectifier of FIG. 1.
Figure 2:
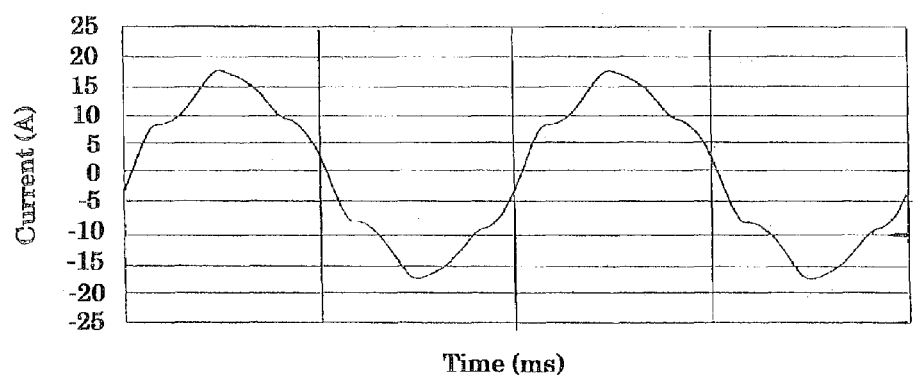
Figure 2:
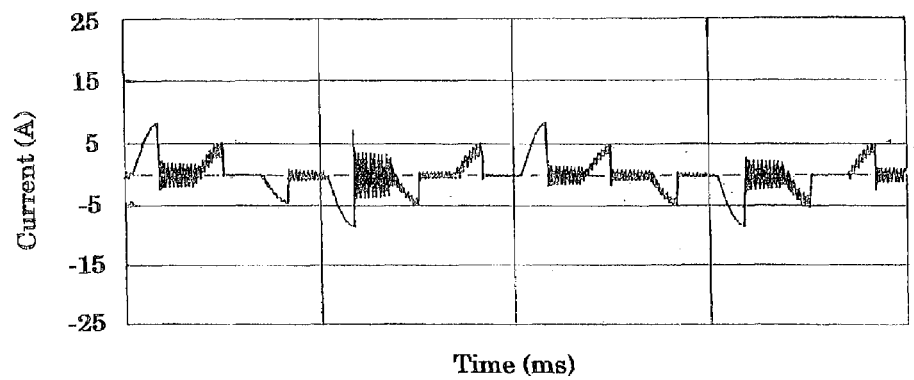
Figure 3:
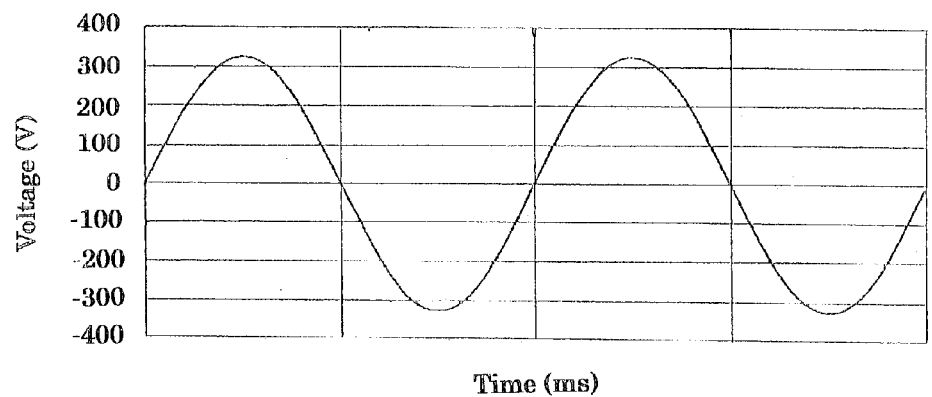
FIGS. 3(A)–3(C) are diagrams illustrating a power supply voltage wave pattern, an input current wave pattern, and a filter capacitor current wave pattern in a conventional three-phase rectifier.
Figure 3:
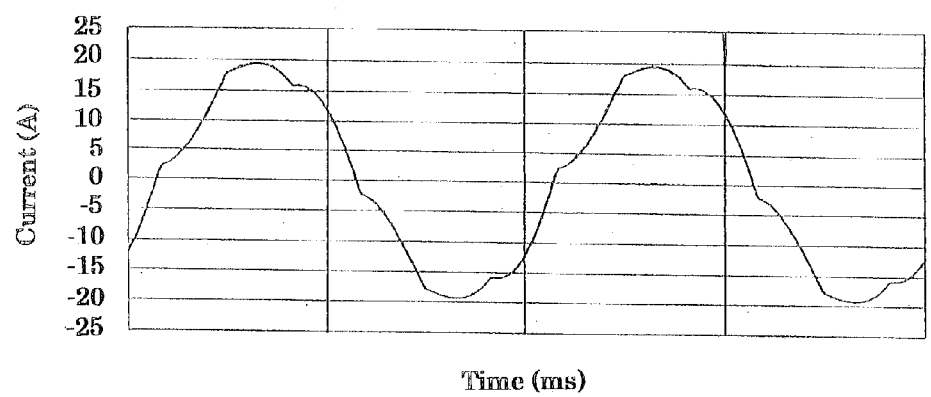
Figure 3:
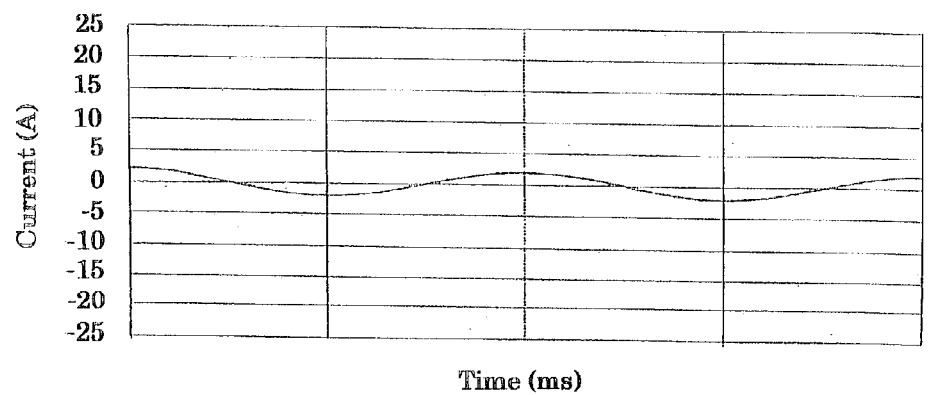
Figure 4:
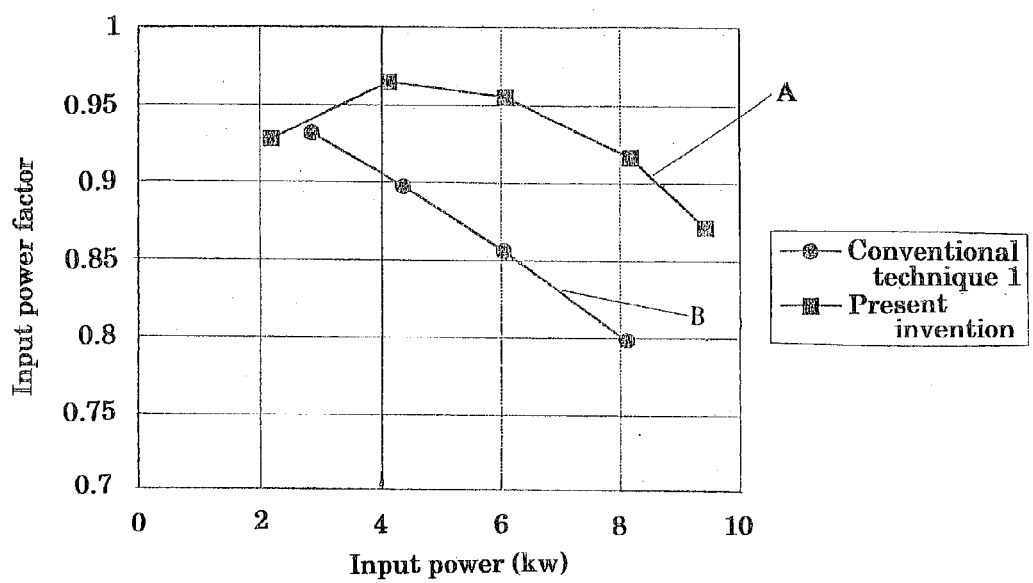
FIG. 4 is a diagram illustrating an input power factor-input power characteristic.
Figure 5:
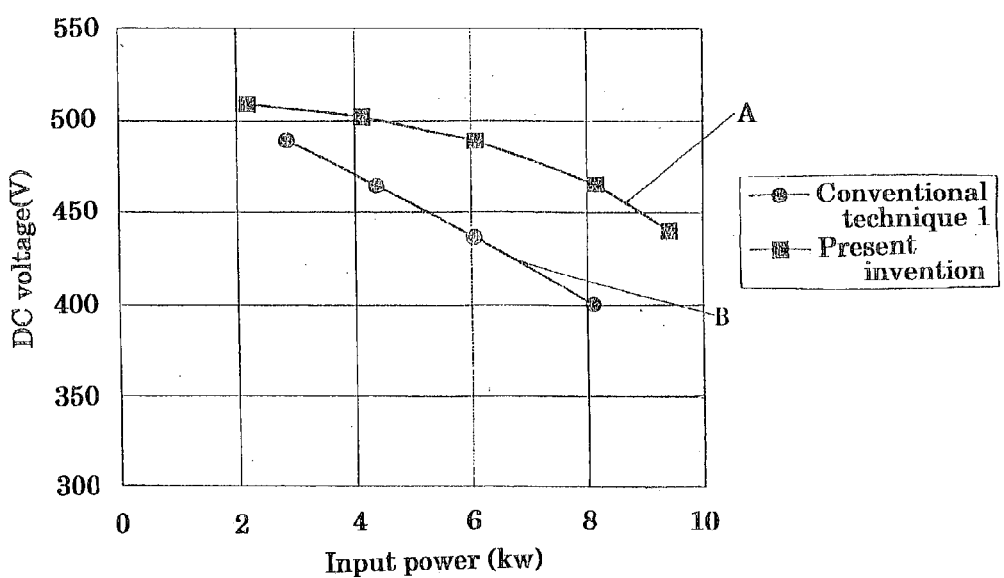
FIG. 5 is a diagram illustrating a DC voltage-input power characteristic.

In the capacitor-input type three-phase rectifier, a low frequency filter comprising AC reactors and filter capacitors in Δ-connection or Y-connection is connected between the three-phase power supply 1 and the diode rectification circuitry 4. Therefore, the phase of the input current is advanced by the resonance current which flows through the low frequency filter and is illustrated in FIG. 2(C) (refer to FIG. 2(B) and FIG. 3(C) which illustrates the phase of the input current of the conventional three-phase rectifier). And, the input power factor is improved, as illustrated with (A) in FIG. 4, with respect to the input power factor of the conventional three-phase rectifier (refer to (B) in FIG. 4). Further, the DC voltage is increased, as illustrated with (A) in FIG. 5, with respect to the DC voltage of the conventional three-phase rectifier (refer to (B) in FIG. 5). In other words, lowering in input power factor and lowering in DC voltage are prevented from occurrence.

Figure 6:
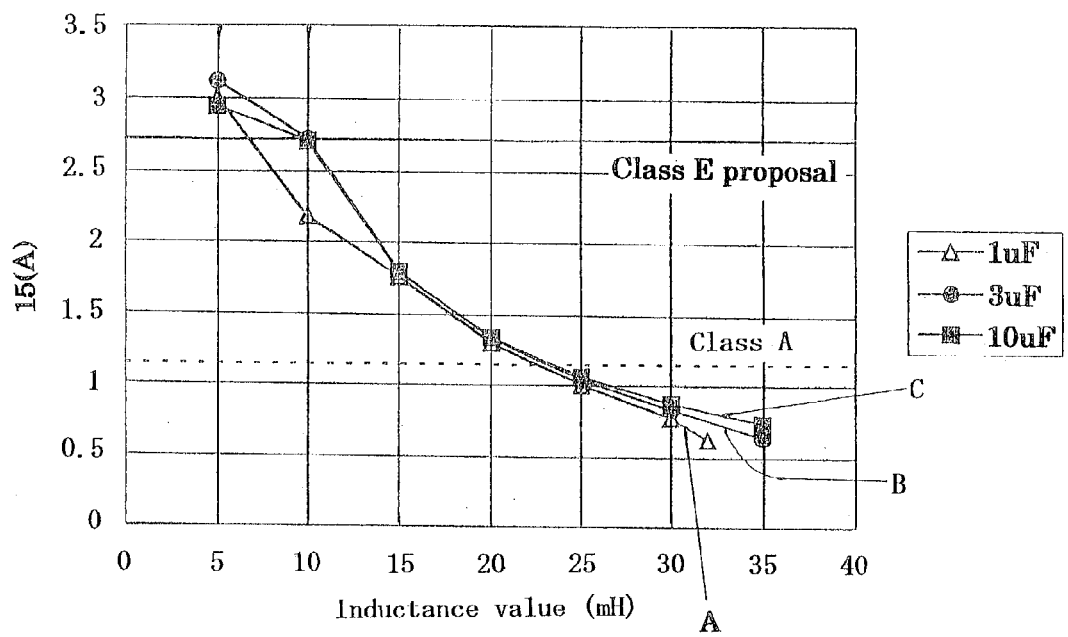
FIG. 6 is a diagram illustrating a fifth harmonic current-inductance value characteristic at the rating power.

In IEC standards, the limit values of higher harmonic currents (class A) are determined for devices having input currents which are equal to or less than 16 A per phase, when the power voltage of the three-phase power supply is 400V grade. To satisfy the standards, the inductance value of each AC reactors should be determined to be equal to or greater than 23 mH, as is understood from FIG. 6. In IEC standards, standards (class E) for professional devices, which is determined by moderating the class A, are under consideration, to satisfy the moderated standards, the inductance value of each AC reactors should be determined to be equal to or greater than 10 mH. (A), (B) and (C) in FIG. 6 represent fifth harmonic current-inductance value characteristics for cases that the capacitance of the filter capacitor is determined to be 1 µF, 3 µF, and 10 µF, respectively, and the operation is carried out with the rating power.

Figure 7:
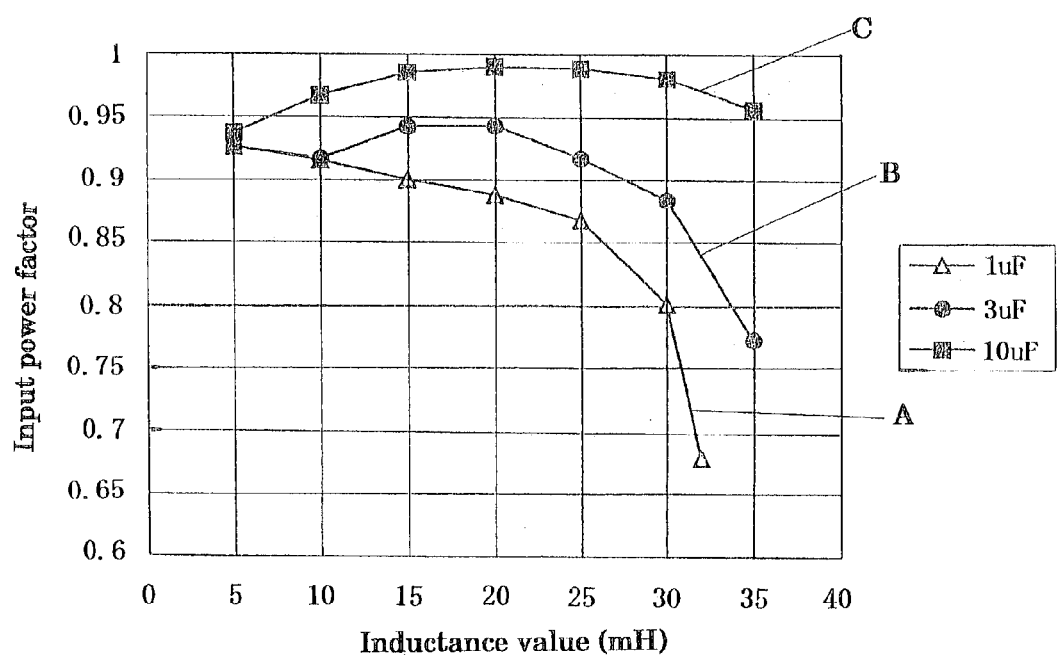
FIG. 7 is a diagram illustrating an input power factor-inductance value characteristic at the rating power.

Further, a high input power factor of equal to or greater than 80% is maintained despite of the capacitance of the filter capacitor by determining the inductance value of the AC reactor to be 30 mH, as is understood from FIG. 7 which illustrates input power factor-inductance value characteristics in cases that the capacitance of the filter capacitor at the rating power is determined to be 1 µF {refer to (A) in FIG. 7}, 3 µF {refer to (B) in FIG. 7} and 10 µF {refer to (C) in FIG. 7}.

Figure 8:
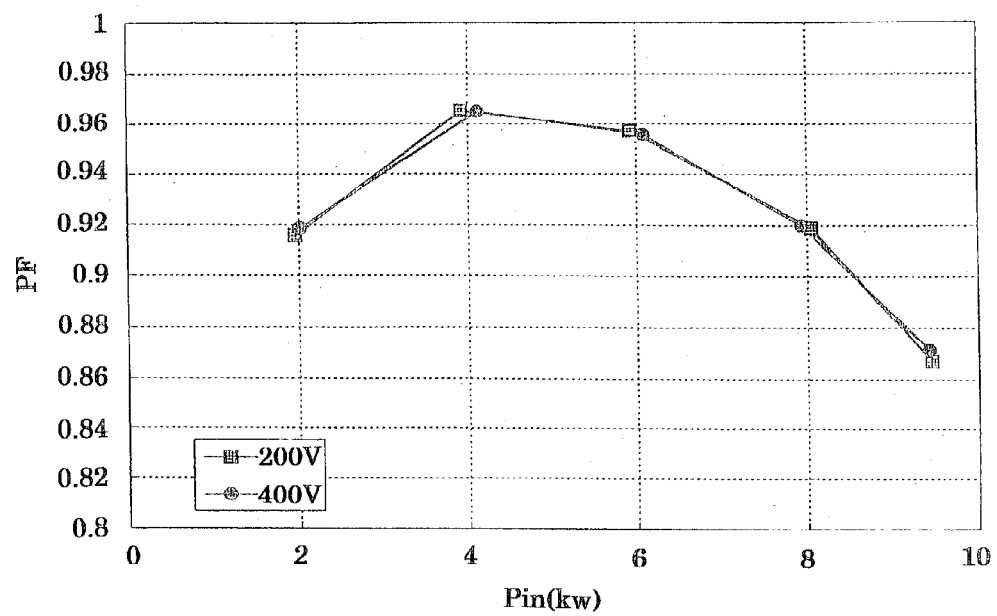
FIG. 8 is a diagram illustrating an input power factor-input power characteristics corresponding to cases where power voltage of three phase AC power supply is 400 V grade and 200 V grade.
Figure 9:
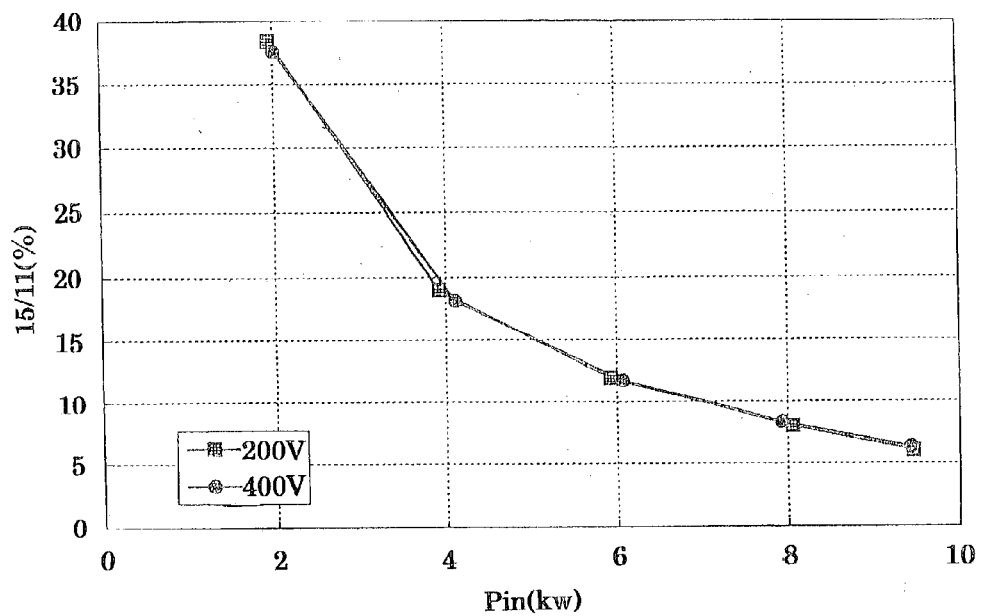
FIG. 9 is a diagram illustrating a fifth harmonic current generation rate with respect to the fundamental wave-input power characteristics corresponding to cases where power voltage of three phase AC power supply is 400 V grade and 200 V grade.
Figure 10:
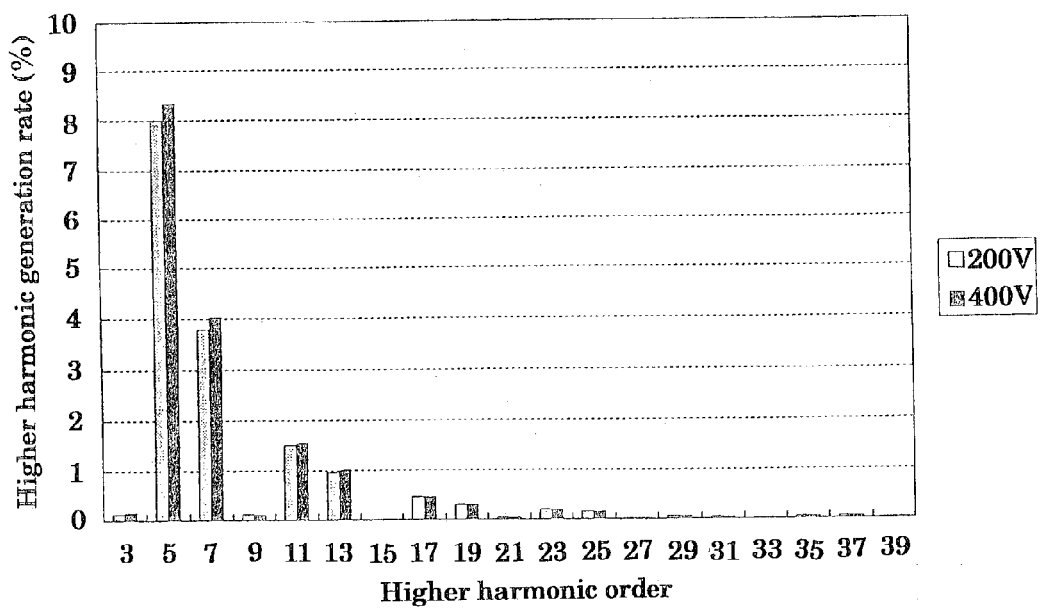
FIG. 10 is a diagram illustrating each of higher harmonic current generation rate with respect to the fundamental wave corresponding to cases where power voltage of three phase AC power supply is 400 V grade and 200 V grade.

FIG. 8 is a diagram illustrating an input power factor-input power characteristics corresponding to cases where power voltage of three phase AC power supply is 400 V grade and 200 V grade, while FIG. 9 is a diagram illustrating a fifth harmonic current generation rate with respect to the fundamental wave-input power characteristics corresponding to cases where power voltage of three phase AC power supply is 400 V grade and 200 V grade, while FIG. 10 is a diagram illustrating each of higher harmonic current generation rate with respect to the fundamental wave corresponding to cases where power voltage of three phase AC power supply is 400 V grade and 200 V grade. In FIGS. 8 and 9, black circles represent the case of 400V grade, while black squares represent the case of 200V grade. In FIG. 10, black sticks represent the case of 400V grade, while white sticks represent the case of 200V grade.

Figure 11:
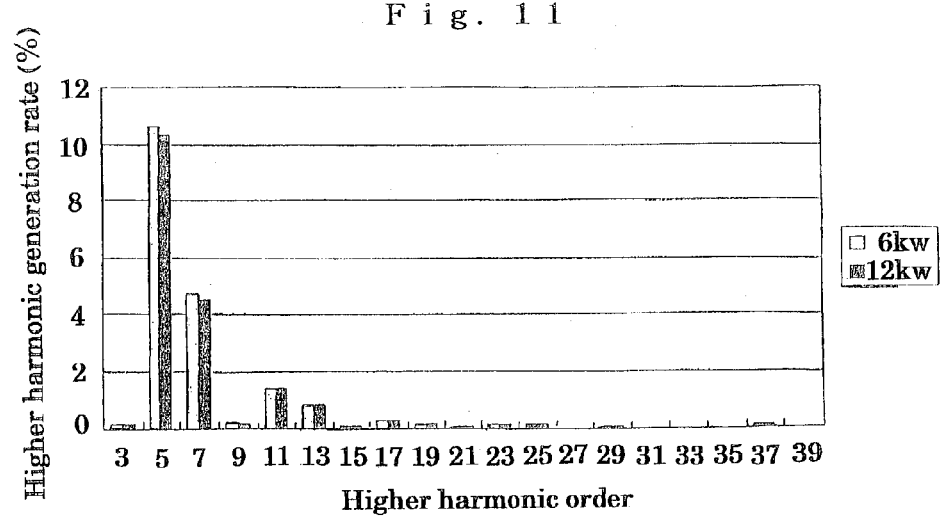
FIG. 11 is a diagram illustrating higher harmonics generation rate with respect to the fundamental wave.

FIG. 11 is a diagram illustrating higher harmonics generation rate with respect to the fundamental wave in cases that the input power is 6 kW and 12 kw. White sticks correspond to the 6 kW case, while black sticks correspond to the 12 kW case. When the rating power of the three-phase rectifier is 12 kW, the inductance value is determined to have a half value (the filter capacitor has a twice value) so as to make the AC reactor to have the same capacitance as that of the AC reactor corresponding to the case that the rating power is 6 kW.

It is understood that the higher harmonic current generation rate with respect to the fundamental wave is determined to be equal to that of the other case, by employing such arrangement.

When the power voltage of the three-phase AC power supply is 200V grade, the higher harmonic current generation rate with respect to the input power factor and the fundamental wave is determined to be equal to that of the other case, as illustrated in FIGS. 8–10, by determining the inductance value to have a ¼ value (the filter capacitor has a 4 times value) so as to make the AC reactor to have the same capacitance as that of the AC reactor corresponding to the case that the power voltage is 400V grade.

Figure 12:
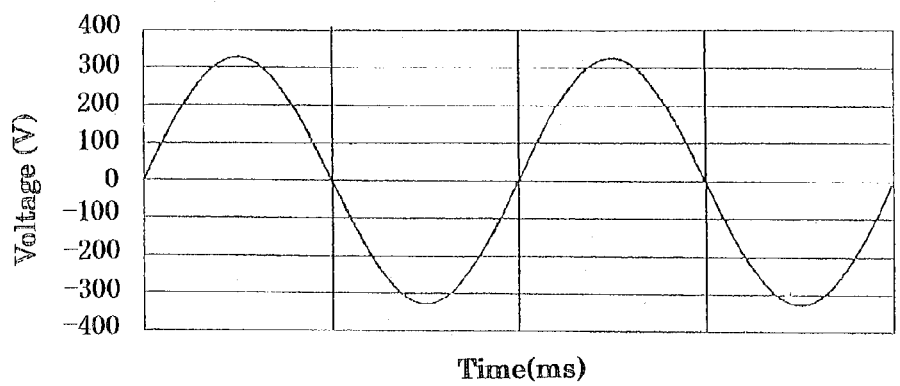
FIGS. 12(A)–(C) are diagrams illustrating a power supply voltage wave pattern, an input current wave pattern, and a filter capacitor current wave pattern where the capacitance of the filter capacitor is determined to be 1 µF.
Figure 12:
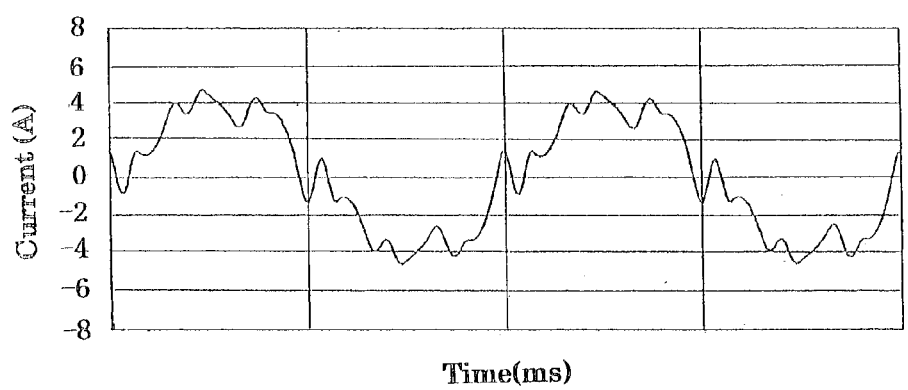
Figure 12:
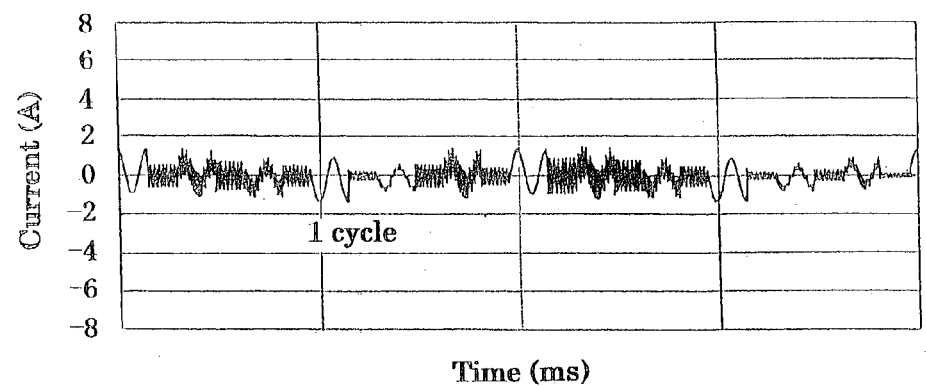
Figure 13:
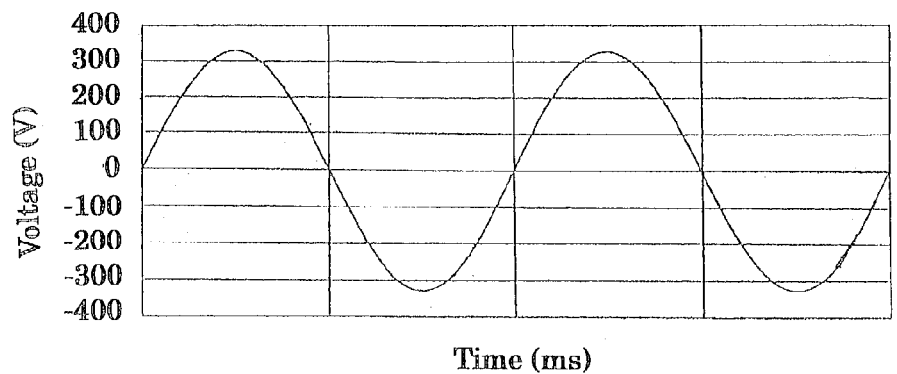
FIGS. 13(A)–(C) are diagrams illustrating a power supply voltage wave pattern, an input current wave pattern, and a filter capacitor current wave pattern where the capacitance of the filter capacitor is determined to be 3 µF.
Figure 13:
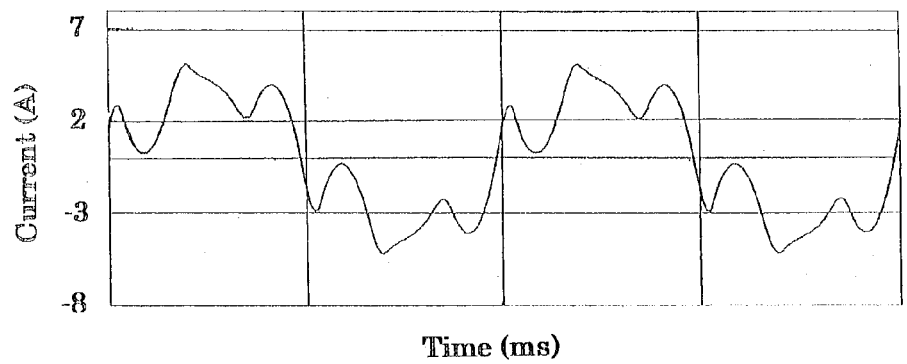
Figure 13:
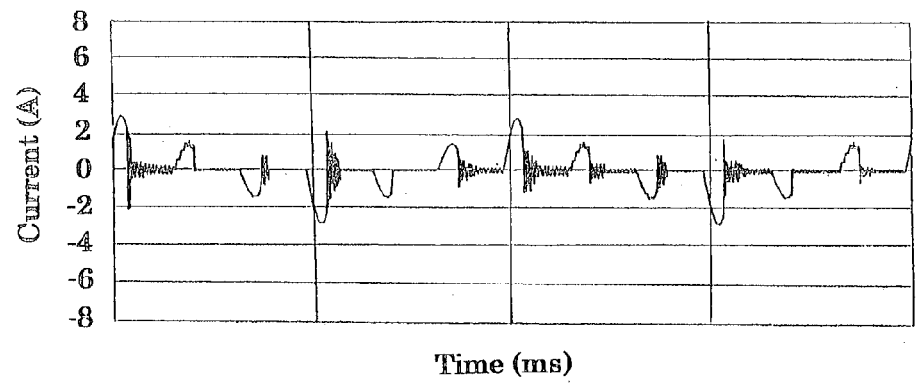
Figure 14:
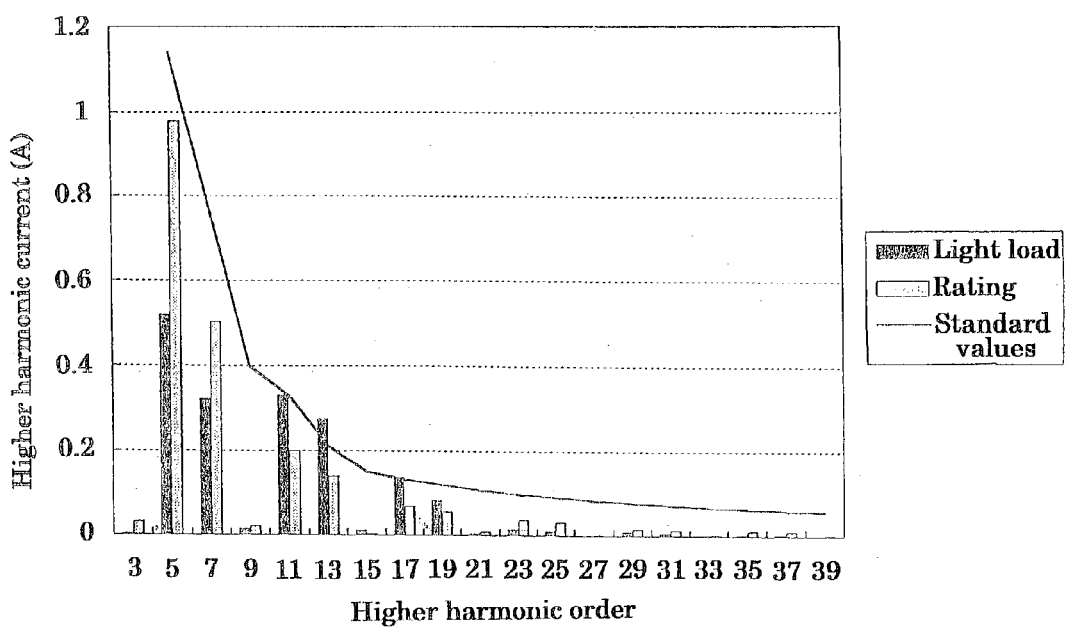
FIG. 14 is a diagram illustrating relationships between harmonic currents at light load and rating load and harmonic current standard values where the capacitance of the filter capacitor is determined to be 1 µF.
Figure 15:
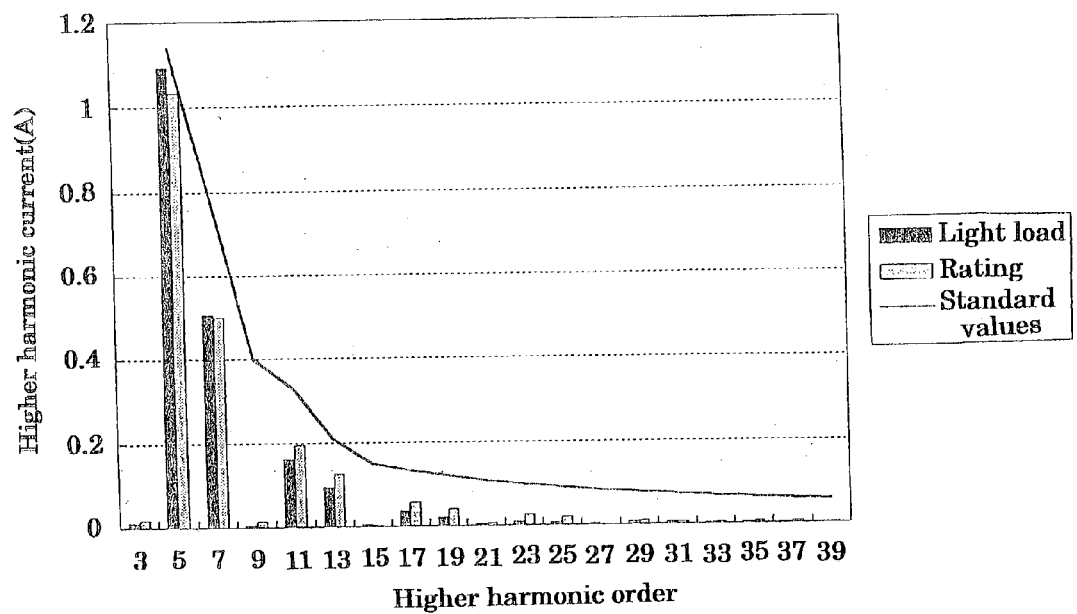
FIG. 15 is a diagram illustrating relationships between harmonic currents at light load and rating load and harmonic current standard values where the capacitance of the filter capacitor is determined to be 3 µF.
Figure 16:
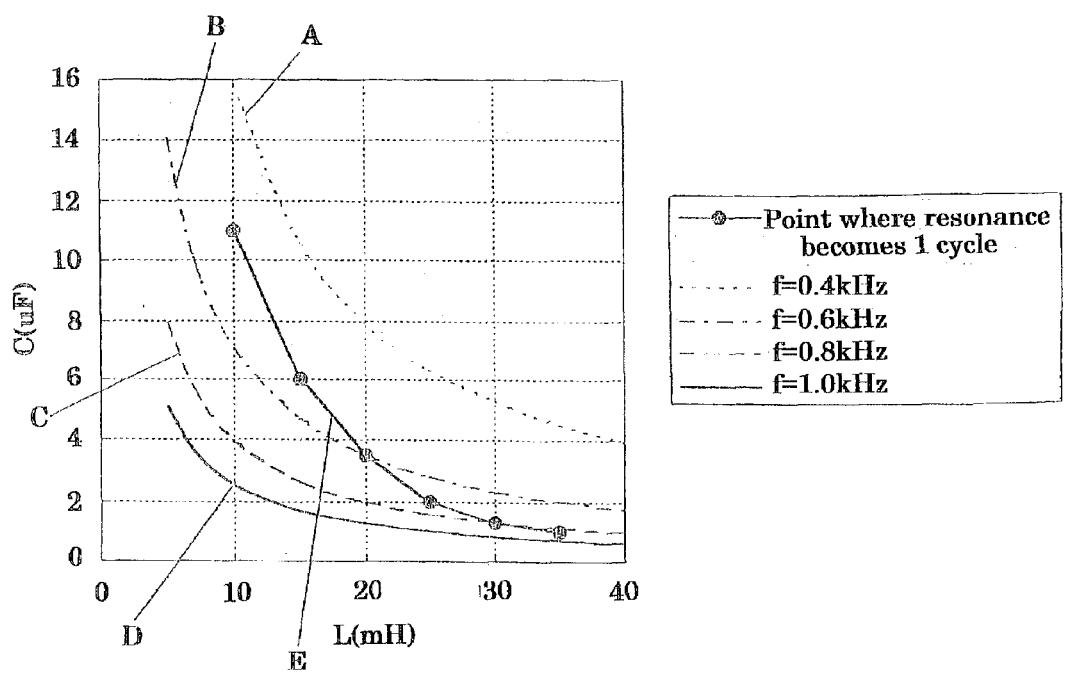
FIG. 16 is a diagram illustrating relationships between a capacitance of the filter capacitor and an inductance value of the AC reactor for determining resonance frequency to be 0.4 kHz, 0.6 kHz, 0.8 kHz, and 1.0 kHz, and a relationship between a capacitance of the filter capacitor and an inductance value of the AC reactor where a resonance period becomes 1 cycle.

When the power voltage of the three-phase AC power supply is 400V grade, and when the inductance value of the AC reactor is determined to be 25 mH, LC resonance period becomes equal to or greater than 1 cycle in a case that the load is light, so that the higher harmonic currents increase so as to be above the higher harmonic current standard values (refer to FIGS. 12–16), by determining the capacitor of the filter capacitance to be equal to or less than 2 μF. FIGS. 12(A)–(C) are diagrams illustrating a power supply voltage wave pattern {refer to FIG. 12(A)}, an input current wave pattern {refer to FIG. 12(B)}, and a filter capacitor current wave pattern {refer to FIG. 12(C)} where the capacitance of the filter capacitor is determined to be 1 μF. FIGS. 13(A)–(C) are diagrams illustrating a power supply voltage wave pattern {refer to FIG. 13(A)}, an input current wave pattern {refer to FIG. 13(B)}, and a filter capacitor current wave pattern {refer to FIG. 13(C)} where the capacitance of the filter capacitor is determined to be 3 μF. FIG. 14 is a diagram illustrating relationships between harmonic currents at light load (refer to black sticks in FIG. 14) and rating load (refer to white sticks in FIG. 14) and harmonic current standard values (refer to a solid line in FIG. 14) where the capacitance of the filter capacitor is determined to be 1 μF. FIG. 15 is a diagram illustrating relationships between harmonic currents at light load (refer to black sticks in FIG. 15) and rating load (refer to white sticks in FIG. 15) and harmonic current standard values (refer to a solid line in FIG. 14) where the capacitance of the filter capacitor is determined to be 3 μF. FIG. 16 is a diagram illustrating relationships between a capacitance of the filter capacitor and an inductance value of the AC reactor for determining resonance frequency to be 0.4 kHz {refer to (A) in FIG. 16}, 0.6 kHz {refer to (B) in FIG. 16}, 0.8 kHz {refer to (C) in FIG. 16}, and 1.0 kHz {refer to (C) in FIG. 16}, and a relationship between a capacitance of the filter capacitor and an inductance value of the AC reactor {refer to (E) in FIG. 16} where a resonance period becomes 1 cycle.

Therefore, higher harmonic current values are determined to be equal to or less than the higher harmonic current standard values even when the load is light, by determining the capacitance of the filter capacitor and the inductance value of the AC reactor to have values corresponding to the above region with respect to (E) in FIG. 16.

Figure 17:
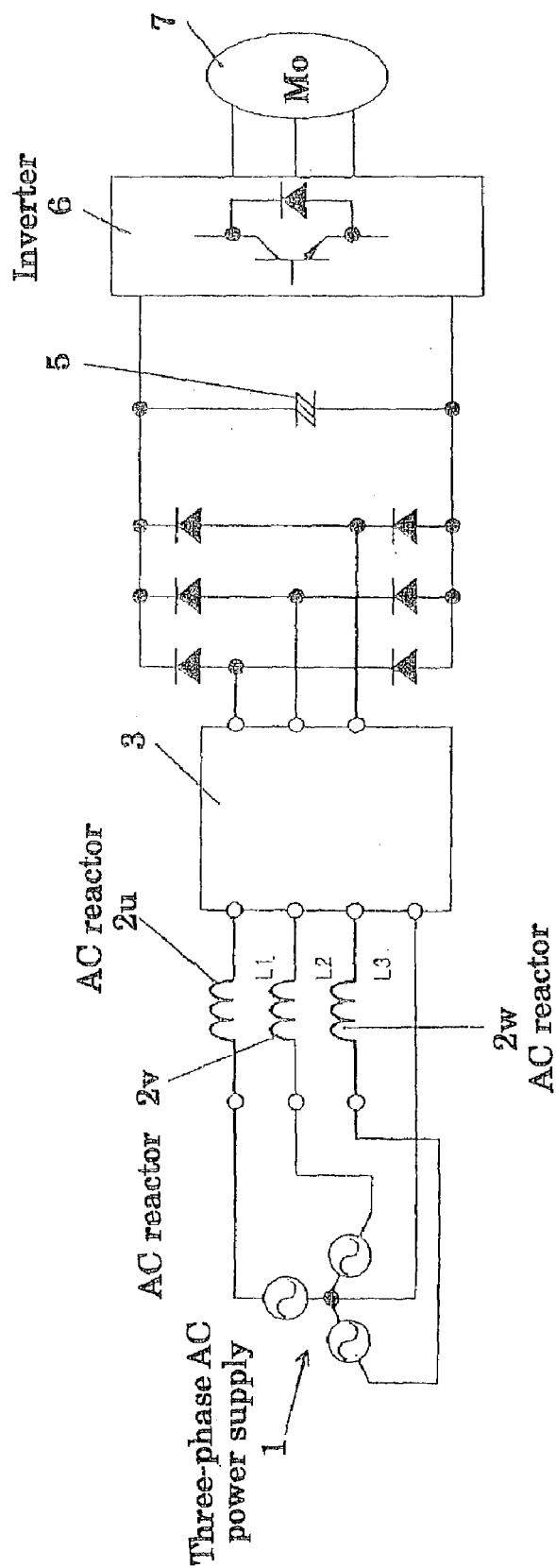
FIG. 17 is an electric circuit diagram illustrating another embodiment of a three-phase rectifier according to the present invention.

FIG. 17 is an electric circuit diagram illustrating another embodiment of a three-phase rectifier according to the present invention.

In this three-phase rectifier, each one terminal of AC reactors $2u$, $2v$ and $2w$ is connected to a terminal of each phase $1u$, $1v$ and $1w$ of a three-phase AC power supply 1. Each the other terminal of the AC reactors $2u$, $2v$ and $2w$ and a neutral point $1n$ are connected to each input terminal of a common mode filter 3. Each output terminal of the common mode filter 3 is connected to each input terminal of a diode rectification circuitry 4. A smoothing capacitor 5 and an inverter 6 are connected in parallel to one another between output terminals of the diode rectification circuitry 4. Also, an output from the inverter 6 is supplied to a motor 7.

A %-impedance of each of three-phase AC reactors is determined to be equal to or greater than 12% and equal to or less than 36%, despite of rating power of the three-phase rectification circuitry. Further, the inductance value of each of the AC reactors is determined to be equal to or greater than $(V/400)^2 \times 10$ m H and equal to or less than $(V/400)^2 \times 30$ m H, where the rating power of the three-phase rectification circuitry is supposed to be about 6 kW and the voltage of the three-phase power supply is supposed to be V.

Figure 18:
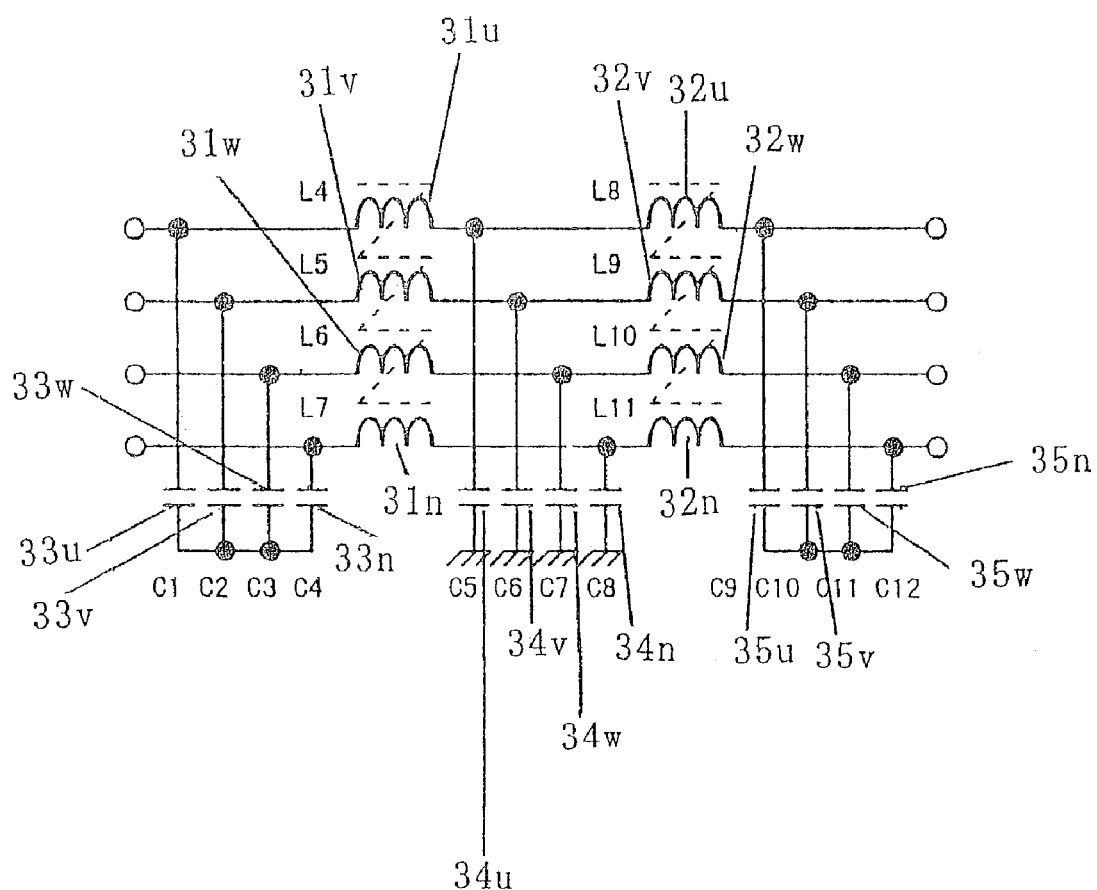
FIG. 18 is an electric circuit diagram illustrating an example of an arrangement of a common mode filter.
Figure 19:
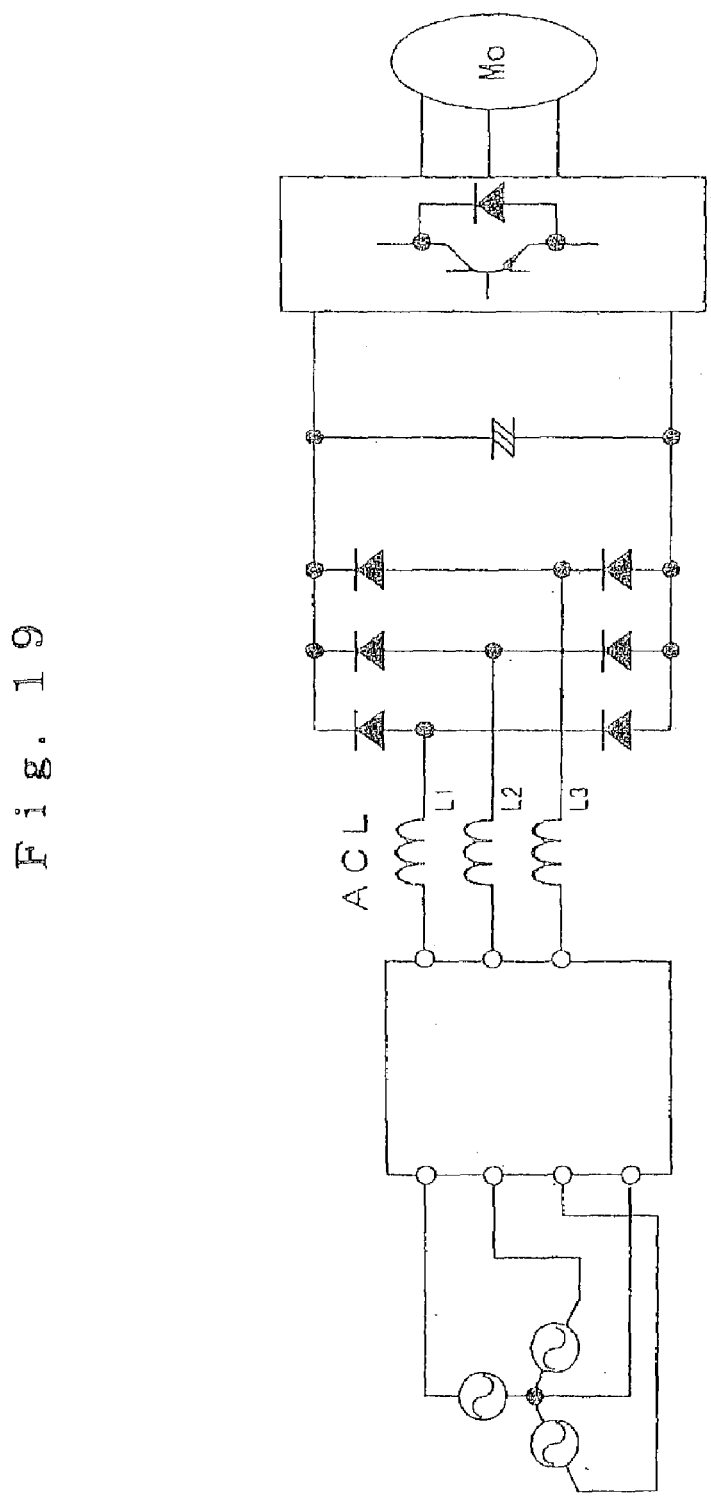
FIG. 19 is an electric circuit diagram illustrating an arrangement of a conventional three-phase rectifier.

FIG. 18 is an electric circuit diagram illustrating an example of an arrangement of a common mode filter.

In this common mode filter 3, each pair of high frequency noise removal reactors $31u$, $31v$, $31w$, $31n$, $32u$, $32v$, $32w$ and $32n$ are connected in series to one another to each input terminal. Each of first capacitors $33u$, $33v$, $33w$ and $33n$ is connected between lines, each of which connecting each of the input terminal and each of the input terminal side high frequency noise removal reactors $31u$, $31v$, $31w$, $31n$. Each of second capacitors $34u$, $34v$, $34w$ and $34n$ is connected between each line and the ground, each line connecting each pair of high frequency noise removal reactors $31u$, $31v$, $31w$, $31n$, $32u$, $32v$, $32w$, and $32n$. Each of third capacitors $35u$, $35v$, $35w$ and $35n$ is connected between lines, each of which connecting each of the output terminal side high frequency noise removal reactors $32u$, $32v$, $32w$ and $32n$ and each of the output terminal. Only output terminals are connected to the diode rectification circuitry 4, the only output terminal corresponding to input terminals each of which is connected to each of the AC reactors $2u$, $2v$ and $2w$.

When the capacitance of the first capacitors $33u$, $33v$, $33w$ and $33n$, the second capacitors $34u$, $34v$, $34w$ and $34n$, and the third capacitors $35u$, $35v$, $35w$ and $35n$ are represented with C1, C2, C3, C4, C5, C6, C7, C8, C9, C10, C11 and C12, each capacitance is determined to satisfy the following equations.

C1=C2=C3=C4=C9=C10=C11=C12=Cx

C5=C6=C7=C8=Cy

Cuv=C1·C2/(C1+C2)+C9·C10/(C9+C10)=Cx

When the three-phase rectifier having the above arrangement is employed, operation and effect, which are similar to those of the filter capacitors, are performed by capacitors included within the common mode filter 3. Therefore, suppressing higher harmonic currents to equal to or less than the higher harmonic current standard values, lowering in input power factor, and lowering in DC voltage are prevented from occurrence, similarly to the embodiment illustrated in FIG. 1.

In this embodiment, it is sufficient that a common mode filter usually employed in the three-phase rectifier. Therefore, capacitors for low frequency filtering are not needed to be provided, so that simplification in arrangement and decrease in cost are realized.

Further, especially provided capacitors and capacitors included within the common mode filter may compose the filter capacitors.

The invention of claim 1 has characteristic effect such that a phase of an input current can be advanced by flowing a resonance current to the low frequency filter, consequently lowering in input power factor and lowering in DC voltage are prevented from occurrence, and that higher harmonic currents are reduced to be equal to or less than standard values by the AC reactors.

The invention of claim 2 has characteristic effect such that a high input power factor is maintained in addition to the effect of claim 1.

The invention of claim 3 has characteristic effect such that a high input power factor is maintained in addition to the effect of claim 1.

The invention of claim 4 has characteristic effect such that higher harmonic currents are determined to be equal to or less than the standard values despite of variation in load in addition to the effect of one of claims 1–3.

The invention of claim 5 has characteristic effect such that capacitors are not needed to be especially provided so that increase in cost is prevented from occurrence in addition to the effect of one of claims 1–4.

The invention of claim 6 has characteristic effect such that increase in cost due to provision of capacitors is suppressed in addition to the effect of one of claims 1–4.

What is claimed is:

1. A three-phase rectifier comprising:

a three-phase AC power supply;

diode rectification circuitry; and a low frequency filter connected between the three-phase AC power supply and the diode rectification circuitry, the low frequency filter consisting of AC reactors and Δ-connection or Y-connection capacitors, wherein a %-impedance of each of the AC reactors is equal to or greater than 12% and equal to or less than 36%.

2. A three-phrase rectifier as set forth in claim 1, wherein the inductance value of each of the AC reactors is equal to or greater than $(V/400)^2 \times 10$ m H (where, V is a voltage of the three-phase power supply) and equal to or less than $(V/400)^2 \times 30$ m H.

3. A three-phase rectifier as set forth in claim 1, wherein a capacitance of the capacitor determines a resonance period of the AC reactor to be equal to or less than 1 cycle even when load is light.

4. A three-phase rectifier as set forth in claim 1, wherein the capacitor comprises a capacitor included within a common mode filter for high frequency noise removal.

5. A three-phase rectifier as set forth in claim 1, wherein the capacitor comprises capacitors including a capacitor included within a common mode filter for high frequency noise removal.

* * * * *